(12) United States Patent
Wang et al.

(10) Patent No.: US 8,126,021 B2
(45) Date of Patent: Feb. 28, 2012

(54) RADIO LINK FAILURE DETECTION PROCEDURES IN LONG TERM EVOLUTION UPLINK AND DOWNLINK AND APPARATUS THEREFOR

(75) Inventors: Jin Wang, Central Islip, NY (US); Stephen E. Terry, Northport, NY (US); Arty Chandra, Manhasset Hills, NY (US); John S. Chen, Downingtown, PA (US)

(73) Assignee: InterDigital Technology Corporation, Wilmington, DE (US)

(*) Notice: Subject to any disclaimer, the term of this patent is extended or adjusted under 35 U.S.C. 154(b) by 580 days.

(21) Appl. No.: 11/742,847

(22) Filed: May 1, 2007

(65) Prior Publication Data

US 2008/0008212 A1 Jan. 10, 2008

Related U.S. Application Data

(60) Provisional application No. 60/798,119, filed on May 5, 2006.

(51) Int. Cl.
*H04J 3/06* (2006.01)
(52) U.S. Cl. ..................... 370/530; 455/550.1
(58) Field of Classification Search .................. 370/503, 370/242, 252, 267, 278, 329, 335, 342, 330, 370/331; 455/450, 452.2, 436–439, 550.1
See application file for complete search history.

(56) References Cited

U.S. PATENT DOCUMENTS

| | | | |
|---|---|---|---|
| 7,016,330 B2 | 3/2006 | Pietraski et al. | |
| 7,079,859 B2 * | 7/2006 | Nobukiyo et al. | 455/522 |
| 7,352,722 B2 * | 4/2008 | Malladi et al. | 370/335 |
| 2004/0203441 A1 | 10/2004 | Smith | |
| 2004/0253955 A1 * | 12/2004 | Love et al. | 455/442 |
| 2005/0215255 A1 * | 9/2005 | Tanoue | 455/436 |
| 2006/0046765 A1 * | 3/2006 | Kogure | 455/522 |
| 2006/0058051 A1 * | 3/2006 | Takano et al. | 455/502 |
| 2006/0166665 A1 * | 7/2006 | Shinoi | 455/426.1 |
| 2006/0178167 A1 * | 8/2006 | Tamura et al. | 455/560 |
| 2006/0187844 A1 * | 8/2006 | Chun et al. | 370/242 |
| 2006/0203780 A1 * | 9/2006 | Terry | 370/335 |
| 2008/0159184 A1 * | 7/2008 | Niwano | 370/278 |

FOREIGN PATENT DOCUMENTS

| | | |
|---|---|---|
| EP | 1 408 658 | 4/2004 |
| EP | 1418777 | 5/2004 |
| EP | 1619918 A1 | 1/2006 |
| EP | 1 881 657 | 1/2008 |

(Continued)

OTHER PUBLICATIONS

Brandt, "Answer to Liaison Statement on Out-of-Synch and DTX", TSG-RAN Working Group Meeting No. 11, TSGR1-00/0198, (Jan. 28, 2000).

(Continued)

*Primary Examiner* — Cong Tran
(74) *Attorney, Agent, or Firm* — Condo Roccia LLP

(57) ABSTRACT

A method and apparatus for detecting a radio link (RL) failure for uplink (UL) and downlink (DL) in a long term evolution (LTE) wireless communication system including at least one wireless transmit/receive unit (WTRU) and at least one evolved Node-B (eNodeB) are disclosed. A determination is made as to whether an RL has an in-synchronization status or an out-of-synchronization status. An RL failure is declared if an out-of-synchronization status is detected.

20 Claims, 3 Drawing Sheets

FOREIGN PATENT DOCUMENTS

| | | |
|---|---|---|
| FR | 2831009 A1 | 4/2003 |
| WO | 93/16562 | 8/1993 |
| WO | 2006/086359 | 8/2006 |
| WO | WO 2007/130324 | 11/2007 |

OTHER PUBLICATIONS

QUALCOMM Europe, *DL PHY Channels: Channel Multiplexing*, 3GPP TSG-RAN WG1 #44, R1-060462, (Denver Feb. 13-17, 2006).

QUALCOMM Europe, *DL PHY Channels: Overall Structure*, 3GPP TSG-RAN WG1 #44, r1-060461, (Denver Feb. 13-17, 2006).

International Patent Application No. PCT/US2007/010394: Notification of Transmittal of International Preliminary Report on Patentability dated Nov. 5, 2008, 12 pages.

International Patent Application No. PCT/US2007/010394: International Search Report dated Mar. 4, 2008, 5 pages.

3rd Generation Partnership Project (3GPP), R2-061071, "Random Access usage for RRC state transitions and mobility support," Texas Instruments, 3GPP TSG-RAN WG2 Meeting #52, R2-061071, Mar. 27, 2006, pp. 1-4.

3rd Generation Partnership Project (3GPP), R2-042271, "LS on Signalling Radio Bearers mapping on HS-DSCH," RAN2, 3GPP TSG-RAN WG2 Meeting #44, R2-042271, Oct. 4, 2004, 2 pages.

3rd Generation Partnership Project (3GPP); TS 25.214 V7.0.0; Physical layer procedures (FDD) (3GPP TS 25.214 Release 7); Mar. 2006, pp. 8-13 and 33-41.

3rd Generation Partnership Project (3GPP), R2-062893, "Handling of Radio Link Failure," ASUSTeK, 3GPP TSG RAN-WG2 #55, R2-062893, Oct. 9, 2006, pp. 1-3.

3rd Generation Partnership Project (3GPP); TS 25.101 V5.18.0, Technical Specification Group Radio Access Network; User Equipment (UE) radio transmission and reception (FDD) (3 GPP TS 25.101 V5.18.0 Release 5); Mar. 2006, 3 pages.

\* cited by examiner

RADIO LINK FAILURE DETECTION PROCEDURES IN LONG TERM EVOLUTION UPLINK AND DOWNLINK AND APPARATUS THEREFOR

CROSS REFERENCE TO RELATED APPLICATIONS

This application claims the benefit of U.S. Provisional Application No. 60/798,119 filed May 5, 2006, which is incorporated by reference as if fully set forth.

FIELD OF INVENTION

The present invention is related to wireless communication methods and apparatus having a medium access control (MAC) layer specifically designed for wireless communication systems such as long term evolution (LTE) systems. More particularly, the present invention is related to criteria and procedures in LTE MAC for detecting radio link (RL) failure in both uplink (UL) and downlink (DL) directions when there is no existing dedicated channel in the LTE system.

BACKGROUND

An objective of Evolved Universal Terrestrial Radio Access (E-UTRA) and Universal Terrestrial Radio Access Network (UTRAN) is to provide a radio access network featuring a high-data-rate, low-latency, packet-optimized system with improved system capacity and coverage. In order to achieve this, the inventors have observed that evolution of the radio interface as well as the radio network architecture is needed. For example, instead of using code division multiple access (CDMA), which is currently used in third generation partnership project (3GPP), orthogonal frequency division multiple access (OFDMA) and frequency division multiple access (FDMA) are proposed air interface technologies to be used in the DL and UL transmissions, respectively, for E-UTRA UTRAN.

Signaling radio bearers (SRB) are used to maintain the connection between a wireless transmit/receive unit (WTRU) and a network by transmitting important information, such as a handover message from the network, e.g., transmitting such information in a dedicated channel (DCH) cell level (Cell_DCH) state in 3GPP. In current 3GPP standards, the SRBs are mapped to dedicated transport channels (TrCHs), (i.e., DCHs), which are then mapped to dedicated physical channels. The dedicated physical channels are comprised of dedicated physical control channels (DPCCHs) and dedicated physical data channels (DPDCHs).

In order to detect the failure of the SRBs, and to take necessary measures following the failure, certain criteria and procedures need to be designed. This is known as radio link (RL) failure detection. In 3GPP, there are two quantities to be estimated for reporting in-synchronization status and out-of-synchronization status. One quantity is a DPCCH quality, and the other quantity is a cyclic redundancy check (CRC) results on the received transport blocks to which the SRBs are mapped.

A Node-B or WTRU should estimate the DPCCH quantities and calculate the CRC in parallel in order to check if the certain criteria are fulfilled for reporting either the in-synchronization status or the out-of-synchronization status. The criteria identified may be only applicable when SRBs are mapped to shared channels, and their associated control channels are identified for RL failure conditions.

Dedicated physical channel availability is indicated by the physical layer to higher layers with a physical channel in-synchronization status indicator or a physical channel out-of-synchronization status indicator. A RL is said to be in synchronization, (in-sync), if it is available to successfully receive data. Otherwise, the RL is said to be in failure, i.e. when it is out of synchronization (out-of-sync). In the current 3GPP standard, it is the responsibility of physical layer to monitor the dedicated physical channels, determine the in-sync and out-of-sync status of every radio frame, and report the results to the radio resource control (RRC) layer using the primitives physical layer control message in-synchronization indicator (CPHY-in-sync-IND) and physical layer control message out-of-synchronization indicator (CPHY-out-of-sync-IND). The RRC layer will declare the physical channel establishment or failure, or RL failure, whenever appropriate based on these indications and associated timers and counters.

In 3GPP, high speed DL packet access (HSDPA) and high speed UL packet access (HSUPA) protocols utilize high speed shared channels primarily for services that do not require continuous channel allocations. Such channels utilize fast physical and MAC layer signaling between Node-Bs and WTRUs for channel assignment and hybrid automatic repeat request (H-ARQ) for efficient and fast recovery of failed transmissions.

When the service supported by a cellular system is mapped to shared channels, the inventors have recognized that the use of dedicated channels to support SRBs is inefficient. This is because the traffic may not be continuous. Thus, it would be desirable to use shared channels to support the SRBs in HSDPA and HSUPA.

SUMMARY

The present invention relates to methods and apparatus for implementing new criteria and procedures for radio link (RL) failure detection in wireless communication systems (e.g., LTE systems). Preferably the invention is implemented for both UL and DL directions by exploiting a new channel structure and characteristics for LTE. Preferably, a shared channel is used to transmit bursty SRBs.

BRIEF DESCRIPTION OF THE DRAWINGS

A more detailed understanding of the invention may be had from the following description of a preferred embodiment, given by way of example and to be understood in conjunction with the accompanying drawings.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "evolved Node-B (eNodeB)" includes but is not limited to a base station, a site controller, an access point (AP), or any other type of interfacing device capable of operating in a wireless environment.

When referred to hereafter, the terminology "thin channel" is a non-contention-based channel that is periodically and/or temporarily allocated to a particular WTRU. A thin channel may be dynamically allocated, (i.e., switched on an off), when needed to maintain radio link status and provide other control signaling. The other control signaling may include synchronization bursts for maintaining timing advance, scheduling requests, scheduling allocations, or any other channel associated control signaling.

In an LTE system, only shared physical channels are used for transmission for both DL and UL. Thus, in addition to data traffic, both real time, (i.e., voice over Internet Protocol (VoIP)), and non-real time, (i.e., web browsing), a control message mapped to SRBs is transmitted through a shared physical channel. This is a distinction from systems that transmit control messages in a dedicated channel (DCH).

Ensuring WTRU and UTRAN detection of SRB loss and recovery with respect to a shared channel presents a problem which is different than when a dedicated channel is used. In the absence of a dedicated channel, burstiness in offered traffic load may cause an undetected SRB failure. This problem exists for both DL and UL.

Figure 1:
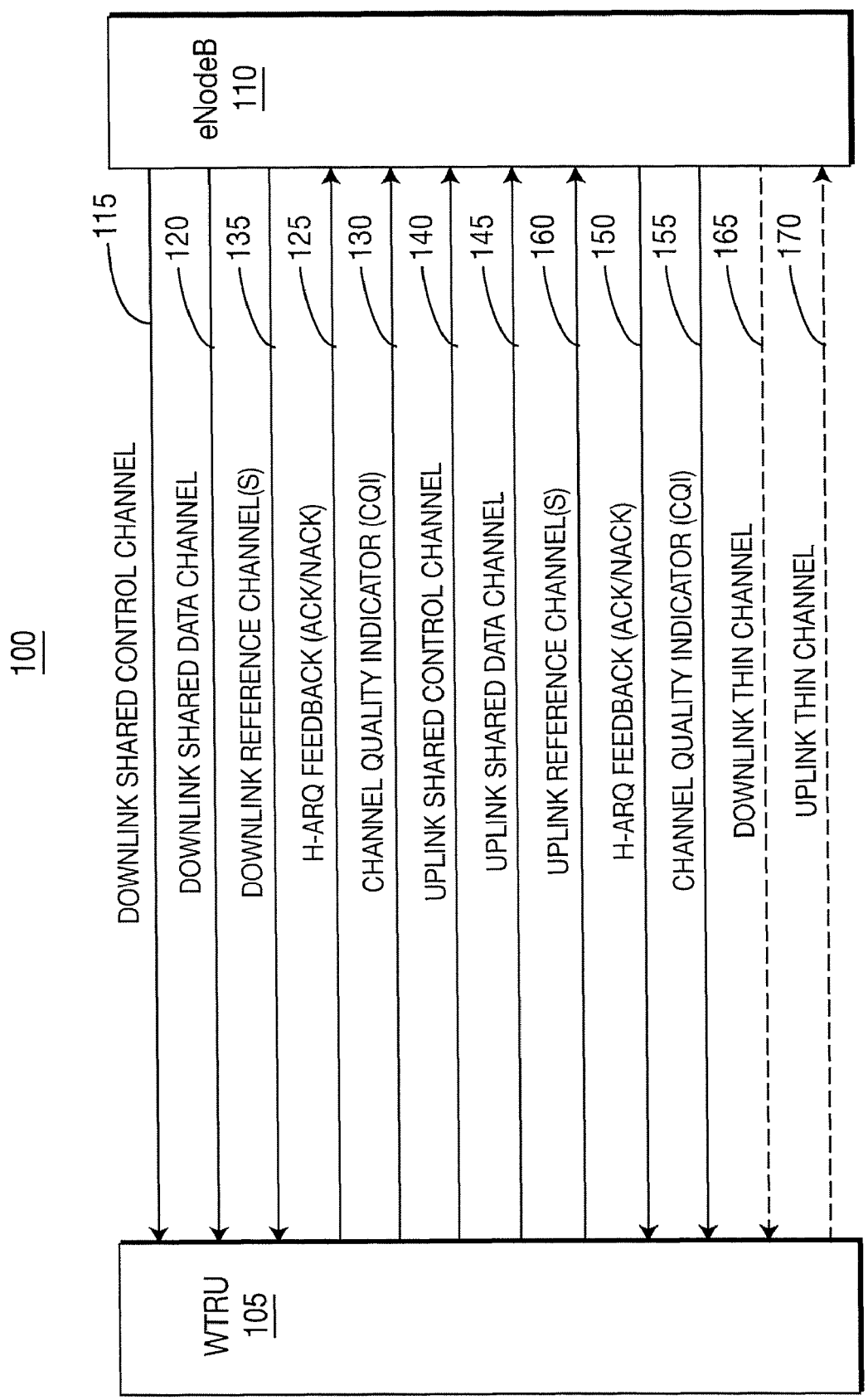
FIG. 1 is a block diagram of an LTE configured in accordance with the present invention.

An LTE system 100 including a WTRU 105 and an evolved Node-B (eNodeB) 110 which addresses this problem in accordance with the present invention is illustrated in FIG. 1. The WTRU 105 and the evolved Node-B (eNodeB) 110 are preferably configured with a hierarchy of processing components including a physical layer component, a MAC layer component and higher layer components. The physical layer component is preferably configured to physically transmit and receive wireless signals. The MAC layer component is preferably configured to provide control functions for the physical layer, and to act as a conduit for data and other signaling from higher layers for formatting and transmission by the physical layer, and to pass data and other signaling received by the physical layer to the higher layer components.

RL Failure Detection in DL—Procedures at the WTRU

As shown in FIG. 1, for DL transmission, scheduling information is transmitted on a DL shared control channel 115 from the eNodeB 110 to the WTRU 105. From the control signaling received on the DL shared control channel 115, the WTRU 105 receives information as to the physical resources that are allocated. A DL shared data channel 120 is used to transmit data from the eNodeB 110 that is received by the WTRU 105 via allocated physical resources. The WTRU 105 then transmits H-ARQ feedback 125 to the eNodeB 110, (i.e., positive acknowledgement (ACK)/negative acknowledgement (NACK)). The WTRU 105 also transmits a channel quality indication (CQI) 130 to the eNodeB 110 based on the measurement and estimation of at least one DL reference channel 135 that is transmitted from the eNodeB 110 and received by the WTRU 105.

The WTRU 105 continuously determines whether an in-synchronization status or an out-of-synchronization status is detected, and reports the results through a signaling message. A higher layer component is configured to preferably declare an RL failure based on appropriate criteria and associated timers and counters, only when an out-of synchronization status is detected. Preferably, the MAC layer component of the WTRU 105 is configured to determine whether an in-synchronization status or an out-of-synchronization status is detected. Quantities used for estimation for the DL RL failure detection are discussed below and are preferably based on the characteristics of the LTE DL channel structure.

To address resource sharing and allocation to the WTRU 105 in terms of availability of the traffic, new procedures have been devised based on new criteria. By exploiting various shared channels and the information contained therein, the following preferred options of criteria are used to declare DL RL failure at the WTRU 105. Preferably, a combination of one or more criteria is selected from the following five preferred categories for this purpose.

1) DL Channel Quality (sliding window average):
1a) whether CQI measured from a DL reference channel, e.g. from a pilot or from a broadcast channel, and reported to the eNodeB is below a specified threshold $Q_{DL\_CQI}$ within a certain period (timer $T_{DL\_CQI}$);
1b) whether CQI from the eNodeB measured on UL reference channels transmitted from WTRU is below a specified threshold $Q_{UL\_CQI}$ within a certain period (timer $T_{UL\_CQI}$) or cannot be received on a regular basis; and
1c) a combination of CQI for both UL and DL.

2) DL Shared Control Channel
2a) whether quality of DL common shared control physical channel, e.g. signal to interference ratio (SIR), energy per bit per noise power spectral density (EbNo), CRC/block error rate (BLER) ($Q_{SC\_DL\_SIR}$, $Q_{SC\_DL\_BLER}$), is below a certain threshold over a specified time period (timers $T_{SC\_DL\_SIR}$, $T_{SC\_DL\_BLER}$); and
2b) whether quality of DL dedicated shared control physical channel, e.g. SIR, EbNo, CRC/BLER, and the like ($Q_{DC\_DL\_SIR}$, $Q_{DC\_DL\_BLER}$), is below certain threshold over a specified time period ($T_{DC\_DL\_SIR}$, $T_{DC\_DL\_BLER}$).

3) DL Shared Data Channel
3a) whether quality of DL data shared physical channel, e.g. SIR, EbNo, CRC/BLER, and the like ($Q_{SD\_DL\_SIR}$, $Q_{SD\_DL\_BLER}$), is below certain threshold over a specified time period (timers $T_{D\_DL\_SIR}$, $T_{D\_DL\_BLER}$);
3b) whether an ACK/NACK ratio generated at WTRU and fed back in UL for the DL data packets is below a specified threshold ($Q_{SD\_DL\_ACK}$);
3c) whether an ACK/NACK ratio fed back from the eNodeB for UL data packets is below a specified threshold ($Q_{SD\_UL\_ACK}$); and
3d) a combination of items 3b) and 3c).

4) UL Resource Grant
4a) whether allocated UL resource cannot guarantee the SRB bit rate;
4b) whether there is a timeout following no response to single/multiple resource requests ($C_{UL\_Request}$) sent over a uplink dedicated physical channel; and
4c) whether there is a timeout following no response to single or multiple resource requests ($R_{UL\_Request}$) sent over a random access channel (RACH) in Active state.

5) A periodic DL Channel for DL Dedicated transmission
5a) whether quality of DL data shared physical channel, e.g. SIR, EbNo, CRC/BLER, and the like, is below a certain threshold over a specified time period (timers $T_{D\_DL\_SIR}$, $T_{D\_DL\_BLER}$);
5b) whether an ACK/NACK ratio generated at WTRU for DL data packets is below a specified threshold ($Q_{DL\_Dedi\_ACK}$);
5c) whether an ACK/NACK ratio provided as feedback from eNodeB for UL data packets is below a specified threshold ($Q_{UL\_Dedi\_ACK}$);

5d) where a UL thin channel is used to probe, (i.e., "ping"), for RL failure based on criteria similar to those used to determine DL RL failure; and 5e) a combination of items 5b) and 5c)

The eNodeB 110 preferably selects a combination of the above quantities and parameters and the corresponding thresholds, timers, counters to be used for RL status detection and then transmits a selected configuration to the WTRU 105. The configuration signals to support the DL RL failure detection preferably include:

1) A combination of estimation quantities and parameters for RL failure detection;
2) Specific timer duration for each quantity and parameter where the RL failure timer configuration is preferably based on the WTRU sensitivity; and
3) Specific counters for each quantity and parameter.

Once the WTRU 105 is configured with this information, it can begin the RL detection process. The signaling for DL RL failure detection preferably uses a DL RL failure indication. A high level procedure can be implemented, preferably in an embodiment dealing with a "Keep Alive" (using thin channel) case or an embodiment dealing with a "Non-Keep Alive" (without using thin channel) case.

Figure 2A:
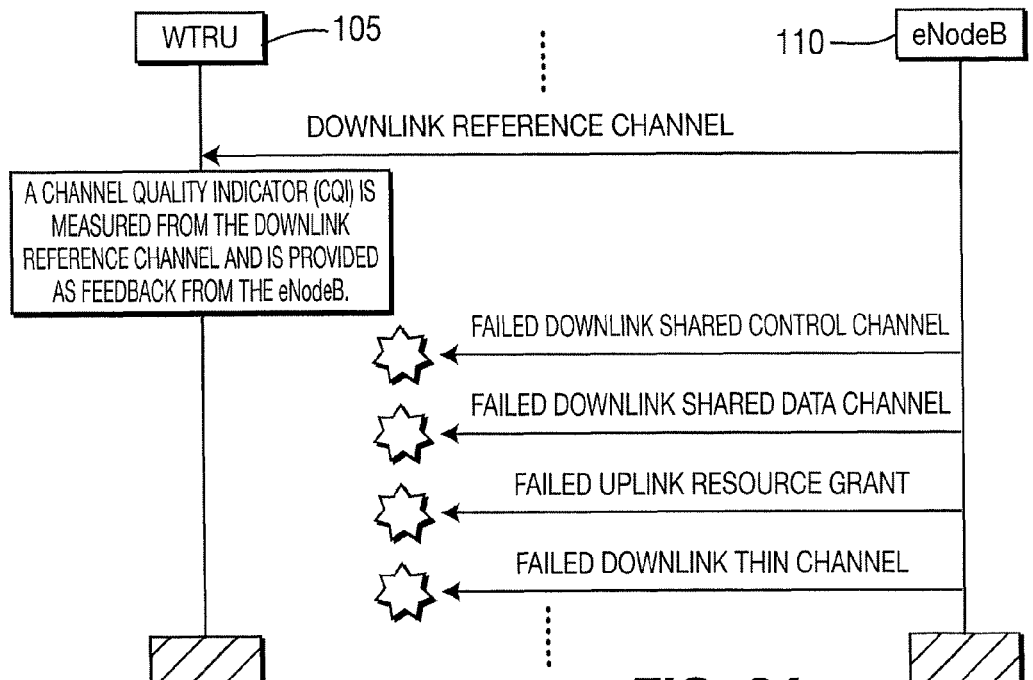
FIG. 2A is a signaling diagram depicting a DL RL failure detection procedure in accordance with the present invention.

FIG. 2A is a signaling diagram depicting a DL RL failure detection procedure in a wireless communication including a WTRU 105 and an eNodeB 110 in accordance with the present invention. As shown in FIG. 2A, a CQI is measured from a DL reference channel and is provided to the WTRU 105 as feedback from the eNodeB 110. The DL RL failure detection may detect the failure of a DL shared control channel, a DL shared data channel, a UL resource grant or a DL thin channel.

Generally, in accordance with the present invention, a high level DL RL detection procedure is preferably implemented with the following steps:

1) A combination of estimation quantities are selected to serve as the criteria for DL RL failure detection. The estimation quantities are preferably a combination of criteria as described above. Preferably, associated thresholds and timers are included as described in above paragraphs individually along with the estimation quantities. Preferably the configuration is determined by the eNodeB 110 and signaled to the WTRU 105.
2) The WTRU 105 is preferably configured with the selected combination of quantities and parameters before the start of the detection procedure. Preferably, the MAC component of the WTRU 105 is provided with the ability to be selectively configurable for this purpose.
3) The WTRU 105, preferably via its MAC component, then monitors the selected combination of quantities and parameters. When the configured estimation quantities do not meet selected thresholds within a pre-configured time period, a DL RL failure is detected and declared.
4) The WTRU 105 then signals the failure status to the eNodeB 110.
5) Actions for DL RL recovery are then taken, and the timers and counters are reset for a new detection.

In accordance with a first embodiment of the present invention, a high level DL RL detection procedure for a keep alive channel scenario of SRBs a pre-allocated DL thin channel is maintained. Where there is a pre-allocated DL thin channel maintained for SRB, the channel quality is measured on a DL thin channel is preferably selected as a main quantity to estimate the quality for DL SRB transmission. Other estimation quantities are selected to serve as a complimentary approach to assist the DL RL failure detection is selecting the combination of estimation quantities with which to configure the WTRU.

In accordance with a second embodiment of the present invention, a high level DL RL detection procedure for a non-keep alive channel scenario of SRBs is implemented. In this case, there is no pre-allocated DL thin channel for SRB service. Although there are other periodic DL receptions, such as DL reference channels, that are not directly related to the DL SRB transmission. Accordingly, such other periodic DL receptions are preferably only used in combination with other quantities which preferably includes the shared data channel transmitting the DL SRBs.

Figure 2B:
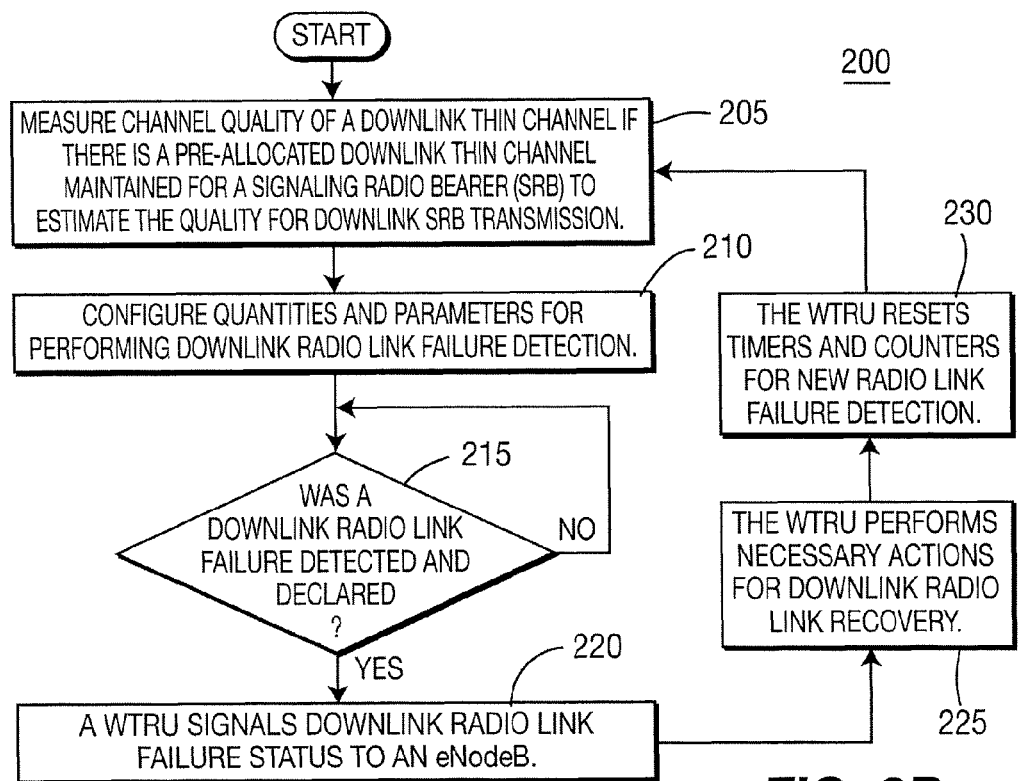
FIG. 2B is a flow diagram of a method for detecting DL RL failure.

FIG. 2B is a flow diagram of a method 200 for detecting DL RL failure. In step 205, the channel quality of a DL thin channel is measured if there is a pre-allocated DL thin channel maintained for an SRB to estimate the quality for DL SRB transmission. In step 210, quantities and parameters are configured for performing DL RL failure detection which is then conducted in step 215. If a DL RL failure is detected and declared in step 215, a WTRU signals DL RL failure status to an eNodeB in step 220. The WTRU then performs necessary actions for DL RL recovery in step 225 and the WTRU resets timers and counters for new RL failure detection in step 230.

RL Failure Detection in UL—Procedures at the eNodeB

As shown in FIG. 1, for UL transmission, the scheduling information is also transmitted on the DL shared control channel 115 from the eNodeB 110 to the WTRU 105. The UL shared control channel 140 is used to send control information from WTRU 105 to the eNodeB 110. From the control signaling received on the DL shared control channel 115, the WTRU 105 receives information as to the physical resources that are allocated. A UL shared data channel 145 is used to transmit data from the WTRU 105 to the eNodeB 110. After receiving UL packets from the WTRU 105, the eNodeB 110 then transmits H-ARQ feedback (ACK/NACK) 150 to the WTRU 105. Furthermore, the eNodeB 110 transmits a CQI 155 to the WTRU 105 based on the measurement and estimation of at least one UL reference channel 160 that is transmitted from the WTRU 105 and received by the eNodeB 110.

The eNodeB 110 continuously determines whether an in-synchronization status or an out-of-synchronization status is detected, and reports the results through a signaling message. A higher layer component is configured to preferably declare an RL failure based on appropriate criteria and associated timers and counters only when an out-of synchronization status is detected. Preferably, the MAC layer component of the MAC layer component of the eNodeB 110 is configured to determine whether an in-synchronization status or an out-of-synchronization status is detected. Quantities used for estimation for the UL RL failure detection are discussed below and are preferably based on the characteristics of the LTE UL channel structure.

Due to the new characteristics of LTE UL channel structure, some new quantities have to be used for estimation for the UL RL failure detection. These quantities may not be exactly the same as those used for DL RL failure detection.

At the eNodeB 110, the information contained in the UL shared control and data channels is used as the estimation quantities of the UL RL failure detection. Specifically, the UL thin channel is used to provide a periodic and/or temporarily allocated link in UL. Thus, the new criteria and parameters for UL RL failure detection may include one or more of the following:

1) whether a reported CQI is below a certain threshold $Q_{UL\_CQI}$ within a specified period $T_{UL\_CQI}$ sliding window average).

1a) whether a CQI to be reported to WTRU (measured from UL reference channel) is below a specified threshold $Q_{UL\_CQI}$ within certain period $T_{UL\_CQI}$;
1b) whether a CQI from feedback from WTRU (measured on the DL reference channels transmitted from the eNodeB) is below a specified threshold $Q_{DL\_CQI}$ within a certain period $T_{DL\_CQI}$; and
1c) a combination of CQI for both UL and DL.
2) Rate Request reception—whether a predefined periodic or polled UL timing synchronization signal is not received for a specified period $T_{UL\_Thin}$.
3) UL Data Reception
   3a) whether no response to the scheduling grants are received for a specified period $T_{UL\_Resp\_ULGrant}$; and
   3b) whether ACK/NACK ratio and/or discarded DL transmissions is below a specified threshold $R_{UL\_ACK}$.
4) UL Data BLER—calculated by ACK/NACK ratio on final data transmission attempt from the WTRU's UL shared data channel.
5) UL Resource Grant
   Allocated UL resources cannot guarantee the SRB bit rate, and timeout following no response to multiple resource requests.
6) UL Control Reception—whether the quality of a UL shared physical channel is below certain threshold $Q_{UL\_SIR}$, $Q_{UL\_BLER}$ (SIR, EbNo, CRC/BLER, and the like) over a specified time period $T_{UL\_SIR}$, $T_{UL\_BLER}$.

A higher layer should determine the subset of the above quantities and what the appropriate thresholds, timers, counters and parameters (as described above) to be used for UL RL status detection should be. The following parameters should be configured to support the UL RL failure:
1) Estimation quantities and parameters to be used for UL RL failure detection;
2) Specific timer duration for each quantity and special parameter; and
3) Specific counters for each quantity and special parameter. The signaling for UL RL failure detection can be the UL RL failure indication.

The eNodeB can begin the UL RL detection process once the eNodeB is configured with above information. Similar to described above for WTRU, the high level procedure can be proposed in two embodiments dealing with the Keep Alive (using thin channel) and Non-Keep Alive (without using thin channel) cases.

Figure 3A:
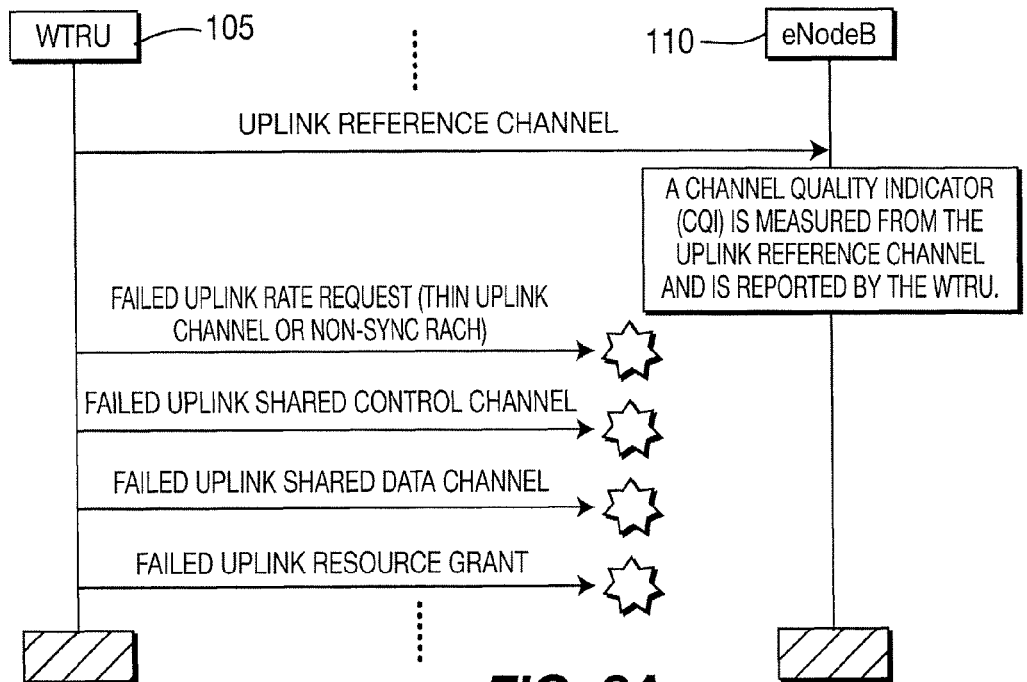
FIG. 3A is a signaling diagram depicting a UL RL failure detection procedure in accordance with the present invention.

FIG. 3A is a signaling diagram depicting a UL RL failure detection procedure in a wireless communication including a WTRU 105 and an eNodeB 110 in accordance with the present invention. As shown in FIG. 3A, a CQI is measured from a UL reference channel and is reported by the WTRU 105. The UL RL failure detection may detect the failure of a UL rate request, (a thin UL channel or a non-synchronous random access channel (RACH)), a UL shared control channel, a UL shared data channel or a UL resource grant.

In accordance with a third embodiment of the present invention, a keep alive channel scenario of SRBs is implemented as follows:
1) Since there is a pre-defined UL thin channel maintained for SRB in this scenario, it is proposed to measure the channel quality on UL thin channel as a main factor to estimate the quality for UL SRB transmission. The DL thin channel may be used to probe, (i.e., "ping"), for RL failure. It may probe based on criteria similar to those used to determine UL RL failure.
2) Other estimation quantities can be used as a complimentary approach to assist the UL RL failure detection. Exact quantities and parameters should be configured before the start of the detection procedure.
3) If the configured estimation quantities are not meeting certain thresholds within a pre-configured time period, then UL RL failure is detected and it should be declared, then:
   a) The eNodeB should signal the failure status to WTRU;
   b) The eNodeB should take the necessary actions for UL RL recovery; and
   c) The eNodeB should reset the timers and counters for new detection.

In accordance with a fourth embodiment of the present invention, a high level UL RL detection procedure for a non-keep alive channel scenario of SRBs is implemented.
1) In this case, there is no pre-allocated UL thin channel for SRB service. Although there are other periodic UL receptions, such as a UL reference channel, these are not directly related to the UL SRB transmission, so they can only be used by combining with other quantities, especially the shared data channel transmitting the UL SRBs.
2) The following procedures are similar as described in step 3) of the third embodiment.

Estimation quantities described above can be used to assist the UL RL failure detection. Exact quantities and parameters (part of or all of them) should be configured before the start of the detection procedure.

If the configured estimation quantities are not meeting certain thresholds within a pre-configured time period, then UL RL failure is detected and it should be declared, then:
   a) The eNodeB should signal the failure status to WTRU;
   b) The eNodeB should take the necessary actions for UL RL recovery; and
   c) The Node-B should reset the timers and counters for new detection.

The gap due to discontinuous reception (DRX)/discontinuous transmission (DTX) should be handled properly while setting the timer or measurements.

Figure 3B:
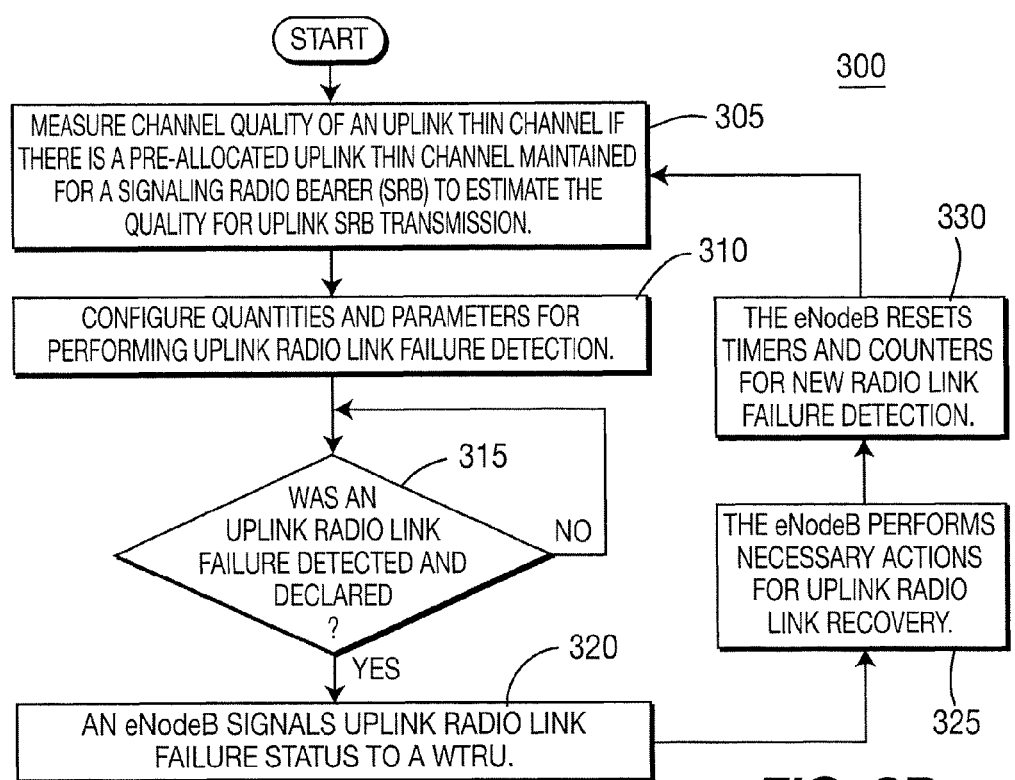
FIG. 3B is a flow diagram of a method for detecting UL RL failure.

FIG. 3B is a flow diagram of a method 300 for detecting uplink radio link failure. In step 305, the channel quality of a UL thin channel is measured if there is a pre-allocated UL thin channel maintained for an SRB to estimate the quality for UL SRB transmission. In step 310, quantities and parameters are configured for performing UL RL failure detection. If an UL RL failure is detected and declared in step 315, an eNodeB signals UL RL failure status to a WTRU in step 320. The eNodeB then performs necessary actions for UL RL recovery in step 325 and the eNodeB resets timers and counters for new RL failure detection in step 330.

The present invention may be implemented in any type of wireless communication system, as desired. By way of example, the present invention may be implemented in any type of LTE, OFDM-MIMO or any other type of wireless communication system. The present invention may also be implemented in software, DSP, or on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s).

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method, implemented by a wireless transmit/receive unit (WTRU), of determining a radio link (RL) synchronization status, the method comprising:
   determining a quality of a downlink (DL) common shared control physical channel;
   comparing the quality to a predetermined threshold; and
   determining that the RL synchronization status is out-of-synchronization upon the comparison indicating an out-of-synchronization condition,
   the quality corresponding to a block error rate, the threshold corresponding to a predetermined block error rate, and the out-of-synchronization condition including the block error rate exceeding the predetermined block error rate.

2. The method of claim 1, wherein the quality is based, at least in part, on a period of time.

3. The method of claim 1 wherein the quality of the downlink (DL) common shared control physical channel is monitored on at least one of a continuous basis or a periodic basis.

4. The method of claim 1 further comprising indicating the out-of-synchronization status to at least one logical layer in communication with a physical layer.

5. The method of claim 4 further comprising:
   transmitting a channel quality indicator (CQI) based on at least one of a measurement or estimation of at least one DL reference channel received by the WTRU.

6. The method of claim 4 further comprising:
   receiving a channel quality indicator (CQI) based on at least one of a measurement or estimation of at least one uplink (UL) reference channel.

7. A method, implemented by an evolved Node (eNodeB), of determining a radio link (RL) synchronization status, the method comprising:
   determining a quality of an uplink (UL) thin channel;
   comparing the quality to a predetermined threshold; and
   determining that the RL synchronization status is out-of-synchronization upon the comparison indicating an out-of-synchronization condition,
   the quality corresponding to a block error rate, the threshold corresponding to a predetermined block error rate, and the out-of-synchronization condition including the block error rate exceeding the predetermined block error rate.

8. The method of claim 7, wherein the quality is based, at least in part, on a period of time.

9. The method of claim 7 further comprising:
   transmitting a channel quality indicator (CQI) based on at least one of a measurement or estimation of at least one UL reference channel.

10. The method of claim 7 further comprising:
    receiving a channel quality indicator (CQI) based on at least one of a measurement or estimation of at least one downlink (DL) reference channel.

11. A wireless transmit/receive unit (WTRU) configured to:
    determine a quality of downlink (DL) common shared control physical channel;
    compare the quality to a predetermined threshold; and
    determine that the RL synchronization status is determined to be out-of-synchronization upon the comparison indicating an out-of-synchronization condition,
    the quality corresponding to a block error rate, the threshold corresponding to a predetermined block error rate, and the out-of-synchronization condition including the block error rate exceeding the predetermined block error rate.

12. The WTRU of claim 11 wherein the WTRU is configured to transmit a channel quality indicator (CQI) based on at least one of a measurement or estimation of at least one downlink (DL) reference channel received by the WTRU.

13. The WTRU of claim 11 wherein the quality is monitored on at least one of a continuous or periodic basis.

14. The WTRU of claim 11 further configured to indicate that the out-of-synchronization status has been detected to a logical layer in communication with a physical layer.

15. The WTRU of claim 11 wherein the WTRU is configured to receive a channel quality indicator (CQI) based on at least one of a measurement or estimation of at least one uplink (UL) reference channel.

16. The WTRU of claim 11 wherein the quality is based, at least in part, on a period of time.

17. An evolved Node (eNodeB) configured to:
    determine a quality of an uplink (UL) thin channel;
    compare the quality to a predetermined threshold; and
    determine that the RL synchronization status is determined to be out-of-synchronization upon the comparison indicating an out-of-synchronization condition,
    the quality corresponding to a block error rate, the threshold corresponding to a predetermined block error rate, and the out-of-synchronization condition including the block error rate exceeding the predetermined block error rate.

18. The eNodeB of claim 17 wherein the eNodeB is configured to transmit a channel quality indicator (CQI) based on at least one of a measurement or estimation of at least one UL reference channel received by the eNodeB.

19. The eNodeB of claim 17 wherein the eNodeB is configured to receive a channel quality indicator (CQI) based on at least one of a measurement or estimation of at least one downlink (DL) reference channel.

20. The eNodeB of claim 17 wherein the quality is monitored on at least one of a continuous or periodic basis.

* * * * *